United States Patent
Matychenkov et al.

(10) Patent No.: US 11,021,412 B2
(45) Date of Patent: Jun. 1, 2021

(54) FERTILIZER COMPRISING BIOAVAILABLE SI AND METHOD FOR PRODUCTION THEREOF

(71) Applicant: ELKEM ASA, Oslo (NO)

(72) Inventors: Vladimir Matychenkov, Moscow (RU); Tor Soyland Hansen, Sogne (NO); Magne Dastol, Kristiansand (NO); Odd Skogerbo, Kristiansand (NO)

(73) Assignee: ELKEM ASA, Oslo (NO)

( * ) Notice: Subject to any disclaimer, the term of this patent is extended or adjusted under 35 U.S.C. 154(b) by 63 days.

(21) Appl. No.: 16/493,836

(22) PCT Filed: Mar. 16, 2018

(86) PCT No.: PCT/NO2018/050074
§ 371 (c)(1),
(2) Date: Sep. 13, 2019

(87) PCT Pub. No.: WO2018/169411
PCT Pub. Date: Sep. 20, 2018

(65) Prior Publication Data
US 2020/0079702 A1     Mar. 12, 2020

(30) Foreign Application Priority Data

Mar. 16, 2017 (NO) .................................. 20170416

(51) Int. Cl.
*C05F 11/02* (2006.01)
*C05G 5/40* (2020.01)
*C05D 9/02* (2006.01)
*C05G 5/12* (2020.01)
*C05D 9/00* (2006.01)

(52) U.S. Cl.
CPC ................ *C05F 11/02* (2013.01); *C05D 9/00* (2013.01); *C05D 9/02* (2013.01); *C05G 5/12* (2020.02); *C05G 5/40* (2020.02)

(58) Field of Classification Search
None
See application file for complete search history.

(56) References Cited

U.S. PATENT DOCUMENTS

| | | | |
|---|---|---|---|
| 3,076,291 A | 2/1963 | Gardner | |
| 3,552,943 A | 1/1971 | McCormack | |
| 6,074,988 A * | 6/2000 | King | C05D 3/00 |
| | | | 504/187 |
| 8,580,979 B1 * | 11/2013 | Shulgin | C05F 11/02 |
| | | | 549/359 |
| 9,656,109 B1 * | 5/2017 | Shulgin | C05C 5/02 |
| 10,472,294 B2 * | 11/2019 | Rezai | C05C 11/00 |
| 2006/0058566 A1 * | 3/2006 | Shulgin | C02F 1/54 |
| | | | 588/316 |
| 2017/0190634 A1 * | 7/2017 | Malshe | C05G 5/23 |
| 2018/0057419 A1 * | 3/2018 | Rezai | B09C 1/08 |

FOREIGN PATENT DOCUMENTS

| | | |
|---|---|---|
| DE | 19859068 A1 | 7/2000 |
| DE | 202007018791 U1 | 6/2009 |
| EP | 2371220 A1 | 10/2011 |
| FR | 340449 A | 7/1904 |
| RU | 2201416 C2 | 3/2003 |
| RU | 2566684 C1 | 10/2015 |
| RU | 2594535 C1 | 8/2016 |

OTHER PUBLICATIONS

International Search Report and Written Opinion for Corresponding International Application No. PCT/NO2018/050074 (8 Pages) (dated Jun. 20, 2018).
Search Report for Corresponding Norwegian Application No. 20170416 (3 Pages) (dated Nov. 5, 2018).
International Preliminary Report on Patentability for Corresponding International Application No. PCT/NO2018/050074) (12 Pages) (Feb. 11, 2019).

* cited by examiner

*Primary Examiner* — Wayne A Langel
(74) *Attorney, Agent, or Firm* — Lucas & Mercanti, LLP

(57) ABSTRACT

The present invention relates to a humic substance based Si-fertilizer product having storage-stable, bio-available Si, which is produced by forming a mixture of, 45-95% by weight of a humic acid-containing raw material, 5-50% by weight of amorphous silica, and 0.5-10 % by weight of an alkali, all amounts based on the total weight of the dry components, incubated in an aqueous medium, and optionally dried and granulated, wherein the bio-available silicon is in the form of water-soluble chelates of monosilicic acid-humate compounds. The invention also relates to a method of producing humic substance based Si-fertilizer, a method for increasing the uptake of silicon in plants and use of the humic substance based Si-fertilizer.

25 Claims, No Drawings

FERTILIZER COMPRISING BIOAVAILABLE SI AND METHOD FOR PRODUCTION THEREOF

CROSS REFERENCE TO RELATED APPLICATION

This Application is a 371 of PCT/NO2018/050074 filed on Mar. 16, 2018 which, in turn, claimed the priority of Norwegian Patent Application No. 20170416 filed on Mar. 16, 2017, both applications are incorporated herein by reference.

TECHNICAL FIELD

The invention relates to humic based Si-fertilizer products and their use in agriculture, environment protection, detoxification and other areas were active humic products are used. In particular the present application relates to humic products comprising a high content of storage-stable bioavailable silicon intended for fertilizing where Si is a limiting factor to, or may improve plant growth.

BACKGROUND ART

Humic material, organic matter, is recognized as important and valuable agricultural material, which can improve the soil fertility level and has direct influence on the crop quality and quantity. Intensive agricultural activity results in degradation of the soil organic matter. The standard method for manufacturing of humic materials for commercial use includes the alkaline treatment of carbon-based substances like brown coal, peat and other organic materials (U.S. Pat. No. 4,459,149). During this processes the carbon-based material converts to soluble (active) forms of the organic molecules, which may have physical-chemical and biological properties as natural humic substances and have positive influence on soil properties and on cultivated plants.

Humic substances can be divided into three main fractions; humic acids, fulvic acids and humins. Humic acid is not a single acid, but rather a complex mixture of many different acids containing carboxyl and phenolate groups so that the mixture behaves functionally as a dibasic acid or, occasionally, as a tribasic acid. The presence of carboxylate and phenolate groups gives the humic acids the ability to form complexes with ions such as $Mg^{2+}$, $Ca^{2+}$, $Fe^{2+}$ and $Fe^{3+}$. Humic acids are insoluble in water at acid pH, whereas fulvic acids are soluble in water across the full range of pH. The humins are a class of organic compounds that are insoluble in water at all pH's.

It is known that silicon (Si) may be a highly beneficial element to enhance growth of plants, and prevent diseases in plants. Silicon fertilizing protects plants against biotic and abiotic stresses, and reduces the content of mobile heavy metals in soil and total content of heavy metals in the cultivated plants. Reduction in use of pesticides, as well as reduction in use of synthetic fertilizers, is thus made feasible.

According to literature, plants can only take up Si in the form of monosilicic acid, or possibly lower oligomers of monosilicic acid, herein also denoted as bio-available Si or plant-available Si. The use of alkaline media can increase the solubility of Si-rich solid materials. However, using K- or Na silicate solution has a drawback of high pH, which may be poisonous to the plants. Thus, a high degree of dilution with water (e.g. 1:100) may be required prior to fertilizing, adding cost and complexity. Another concern relating to solutions of monosilicic acid is that such solutions are not thermodynamically stable, but will over time lead to polymerization of the monosilicic acid into polysilicic acid, and hence the Si becomes bio-unavailable. Further, a dry Si-fertilizer product is advantageous with respect to handling and storage of the product, as well as easing the application of the product. However, drying a monosilicic acid containing product will transform the monosilicic acid, and any polysilicic acid, to silicon dioxide, which is also a bio-unavailable form of Si.

U.S. Pat. No. 3,552,943 relates to a fertilizer composition comprising ammonium-humate-silica complex. The ammonium-humate-silica complex is formed by oxidation of agricultural waste having high silica content, said oxidation being conducted under controlled temperature and pressure conditions substantially to retain the integrity of the molecular structure of the silica as it exists in said waste, and thereafter combining said silica with ammoniated humic acid. The resulting product is a gelatinous of colloidal mixture. The process for manufacturing the fertilizer according to U.S. Pat. No. 3,552,943 is complicated and not economically feasible.

Conventional Si fertilizers have low content of bio-available silicon, and therefore large amounts of such fertilizers must be used in order to get sufficient silicon uptake in plants and yield of cultivated plants. Thus, there is a desire for a more cost effective and hence affordable Si-fertilizer for a wide range of agricultural products. Such Si-fertilizer product should have a high content of bio-available silicon. Further, such Si-fertilizer should preferably be available as a dry material, and be long-time storage stable while maintaining the high content of bio-available silicon.

The present inventors have managed to make a new humic substance based Si-fertilizer product with a high content of bio-available Si, and which is long-time storage stable with respect to the contents of bio-available Si. The present inventors found that the reaction between humic substances and monosilicic acid can be realized during an alkaline incubation process, and a new product is formed with a high content of bio-available Si. It was surprisingly found that the product can be dried, still maintaining a high level of bio-available Si, which is also long time storage-stable. The remains of the reaction between humic substances and monosilicic acid, which do not dissolve during the incubation process, can be applied to soil as well for long term positive effect on soil properties and cultivated plant production and quality.

One of the advantages of the present Si-fertilizer, having a high content of bio-available Si, is that the amount of fertilizer (expressed in kg/ha; kilograms per hectare) can be significantly reduced compared with conventional Si-fertilizers. Another advantage of the present invention is that the process for producing the Si-fertilizer into a storage-stable product, while maintaining a high content of bio-available Si, is simple and does not include any separation and/or filtration steps. The Si-fertilizer may be dried, forming a powder or granular product. These and other advantages with the present inventions will become evident in the following description.

SUMMARY OF THE INVENTION

The new Si-fertilizer, according to the present invention, is a storage-stable humic substance based fertilizer containing bio-available Si. The said Si-fertilizer is produced by forming a mixture of (based on the total weight of the dry components), 45-95% by weight of a humic acid-containing raw material, 5-50% by weight amorphous silica, and 0.5-10% by weight of an alkali, incubated in an aqueous medium, optionally dried and granulated, wherein the bio-available silicon is in the form of water-soluble chelates of monosilicic acid-humate compounds.

In the present context the term "bio-available Si" should be understood as denoting compounds of silicon which are in a transferable form to be taken up or absorbed by the roots of the plants, that is monosilicic acid, $H_4SiO_4$, commonly noted $Si(OH)_4$, or possibly lower oligomers of monosilicic acid.

Without being bound by the theory, the bio-available Si in the present Si-fertilizer is believed to be formed by a complexing reaction between monosilicic acid and derivatives of humic acid dissolved as humates, thereby forming a water-soluble and storage stable monosilicic acid-humate chelate. The chelates formed by complexing to reactions prevent the monosilicic acid to polymerize into polysilicic acid, which is a bio-unavailable form of silicon. The thus formed chelates are also water soluble, even after drying and longtime storage, hence, the silicon is maintained in the bio-available form of monosilicic acid.

By the term "storage-stable bio-available Si" in the present context, it should be understood that the amount of bio-available Si in the Si-fertilizer is maintained high compared with a freshly produced product, even after longtime storage. As to the term "longtime storage" it should be noted that tests performed by the inventors using the Si-fertilizer according to the present invention, having been stored for one year, surprisingly gave approximately the same results, measured in crops yield and Si uptake, as a freshly produced product.

In a first embodiment of the present invention, the incubated mixture (also denoted incubated slurry and/or incubated suspension) is dried until a residual moisture of less than 15% by weight, and hence, the dried product has a residual moisture of less than 15% by weight. The water content of the resulting product should however not be less than 5% by weight.

In a second embodiment of the present invention, the humic substance-based Si-fertilizer further includes a matrix comprising remainings/residues of the humic acid-containing raw material and residues of the amorphous silica. The said residues are mainly undissolved humins, from the carbon-based humic acid-containing raw material, as well as any undissolved remains of the amorphous silica, which do not dissolve during the incubation. These undissolved remains have longterm positive effect on soil properties and cultivated plant production and quality, giving a sustainable supply of bio-available silicon needed for the plant immunity system through slow release. In a third embodiment of the present invention, the humic acid-containing raw material is selected from coal, brown coal, peat and humic soil, or a mixture of thereof.

In a forth embodiment of the present invention, the amorphous silica is selected from the group; microsilica, diatomaceous earth, rice husk ash and zeolites, or a mixture thereof.

In a fifth embodiment of the present invention, the alkali is chosen among an alkali metal hydroxide, an alkaline earth metal hydroxide or a mixture thereof.

In a sixth embodiment of the present invention, the dried product is de-agglomerated and/or granulated.

In a seventh embodiment of the present invention, the Si-fertilizer is an aqueous suspension.

In another aspect the present invention relates to a method for the production of a humic substance based Si-fertilizer containing storage-stable bio-available Si, comprising the following steps;

mixing 45-95% by weight of a humic acid-containing raw material, 5-50% by weight of an amorphous silica and 0.5-10% by weight of an alkali (all amounts based on the total weight of the dry components), in an aqueous medium forming an aqueous suspension;

incubating the suspension, and optionally drying the resultant incubated suspension.

In a first embodiment of the method, according to the present invention, the resultant incubated suspension is dried until a residual moisture content of less than 15% by weight. The water content of the resulting dried product should however not be less than 5% by weight.

In a second embodiment of the method, according to the present invention, the aqueous suspension is incubated at a temperature between 20-70° C. for a period of at least 1 hour.

In a third embodiment of the method, according to the present invention, the incubated mixture is dried by heating to a product temperature between 15 and 95° C.

In a fourth embodiment of the method, according to the present invention, the humic acid-containing raw material is selected from coal, brown coal, peat and humic soil, or a mixture thereof. The humic acid-containing raw material may be added in an amount of 60-90% by weight, or 75-85% by weight, based on the total weight of dry components.

In a fifth embodiment of the method, according to the present invention, the amorphous silica is selected from the group; microsilica, diatomaceous earth, rice husk ash and zeolites, or a mixture thereof. The amorphous silica may be added in an amount of 10-30% by weight, or 15-25% by weight, based in the total amount of dry components.

In a sixth embodiment of the method, according to the present invention, the alkali is chosen among an alkali metal hydroxide, an alkaline earth metal hydroxide or a mixture thereof.

In a seventh embodiment of the method, according to the present invention, the amount of water is 25-70% by weight, based on the total weight of the suspension.

In an eight embodiment of the method, according to the present invention, the initial pH in the aqueous suspension, before incubation, is 9.5 or higher.

In a ninth embodiment of the method, according to the present invention, the dried product is de-agglomerated, and/or granulated.

The resulting humic substance based Si-fertilizer, according to the present invention, is primarily a dried product having a residual moisture content, which allows de-agglomeration and/or granulation, and where the product appears as dry in handling and usage. The said dried product may be crushed and screened. The product may also be granulated by using conventional granulation methods. A product having a residual humidity of about 10% by weight (based on the total weight of the mixed product) will typically be suitable for use. It should however be noted that the moisture content in the product may deviate from the indicated 10% by weight, still allowing de-agglomeration and handling of the product, as stated above.

By having some residual moisture in the product, there is no major change in the chelate structure, as only excess free water is removed during the drying. Thus, the amount of monosilicic acid bound as chelates is maintained, and the silicon is preserved in a bio-available form, readily soluble, even after long time storage.

Keeping some moisture in the product also prevents dusting in handling.

The Si-fertilizer, according to the present invention, should preferably be stored in sealed containers or bags.

The Si-fertilizer, according to present invention, may be applied as an aqueous suspension, either without drying the incubated suspension or alternatively the dried product mixed with water.

In a further aspect the present invention includes a method for increasing the uptake of silicon in cultivated plants, comprising addition of the humic substance based Si-fertilizer to the soil, according to the present invention, before seeding or planting and/or during the growth of the plants. The humic substance based Si-fertilizer may be added in an amount of typical 50-1000 kg/ha.

The Si-fertilizer may be spread as a dry product, usually followed by irrigation. As stated above, the Si-fertilizer may also be applied as an aqueous suspension. It is also possible to re-disperse the Si-fertilizer by adding water before adding to the soil.

The humic substance based Si-fertilizer, according to present invention, may be used to obtain at least one of the following; a high uptake of Si in cultivated plants to enhance growth of plants, to prevent diseases in plants, for protecting plants against biotic and/or abiotic stresses, reducing the content of mobile heavy metals in soil and/or the total content of heavy metals in the cultivated plants; and hence to increase the crop yield and quality.

The humic substance based Si-fertilizer may be used alone or in addition to conventional fertilizers added to crops.

DETAILED DESCRIPTION OF THE INVENTION

According to the present invention a storage-stable humic substance based fertilizer containing bio-available Si is produced. The fertilizer is produced by forming a mixture of (based on the total weight of the dry components), 45-95% by weight of a humic acid-containing raw material, 5-50% by weight amorphous silica, and 0.5-10% by weight of an alkali, which mixture is incubated in an aqueous medium, possibly dried and de-agglomerated. The bio-available silicon in the thus produced product is in the form of water-soluble chelates of monosilicic acid-humate compounds.

In the present context the term "incubating" may also be interpreted as leaching and/or maturing. Incubating is denoting the process step wherein the alkaline aqueous suspension is left for a time and at a temperature wherein the raw materials are leached in the alkaline solution. Further, the complexing reactions between dissolved monosilicic acid and humic acid takes place during the incubation.

The humic acid-containing raw material may be any humic substances. The preferred humic acid-containing raw materials advantageously have a high content of humic acid. Examples of such humic substances having a high content of humic acid are different types of coal, such as e.g. brown coal (lignite, leonardite), peat and humic soil. The amount of humic acid-containing raw material is defined to be from 45-95% by weight, based on the total content of the dry materials. In an embodiment, the amount of humic acid-containing raw material may be between 60-90% by weight, e.g. 75-85% by weight. The amount of humic acid-containing raw material added in the mixture may rely on e.g. the content of humic acid in the raw material. The humic acid-containing raw material should be grounded to a fine powder, particle of mm size, e.g. 0.1-3 mm, to increase the reaction kinetics.

The amorphous silica suitable for the method of production of the humic substance based Si-fertilizer, according to the present invention, may be a low cost silica selected from the group; microsilica, diatomaceous earth, rice husk ash, perlite and zeolites, or a combination of these. Amorphous silica is preferred silica source because it has a much higher solubility compared to crystalline silica, which is already present in the soil. A high specific surface area increases the dissolution rate of silica (provided it is available to the alkaline solution) to the desirable monosilicic acid. An amorphous silica especially suitable for the present invention has a specific surface area about 5-50 $m^2/g$ (BET), and a particle size in the nano or micron area, e.g. 0.01-50 μm, preferably less than 5 μm. The morphology and particle size distribution of the amorphous silica should be uniform, as this favors uniform dissolution of the particles in the alkali aqueous suspension. Microsilica is advantageous as it is available with uniform morphology and particle size distribution within a narrow range, as well as a suitable high specific surface area. The term "microsilica" used in the specification and claims of this application refers to particulate, amorphous $SiO_2$ obtained from a process in which silica (quartz) is reduced to SiO-gas and the reduction product is oxidized in the vapor phase to form amorphous silica. Microsilica may contain at least 70% by weight silica ($SiO_2$), and preferably >95% by weight $SiO_2$, and has a specific gravity of 2.1-2.3 $g/cm^3$ and a specific surface area of 5-50 $m^2/g$ (BET), typically 20 $m^2/g$. The primary particles are substantially spherical and may have an average size of about 0.15 μm, as calculated by volume. Microsilica is preferably obtained as a co-product in the production of silicon alloys in electric reduction furnaces, but may also be (co)-produced in other processes.

The amount of amorphous silica added to the mixture is 5-50% by weight. In an embodiment, the amount of amorphous silica is between 10-30% by weight, e.g. 15-25% by weight.

The term "alkali", as used herein, denotes soluble bases which contain and release hydroxide ions ($OH^-$) in aqueous solutions to form an alkaline solution which has pH more than 7. The alkali should be a strong base such as alkali metal hydroxide, such as NaOH and KOH, an alkaline earth metal hydroxide, such as $Ca(OH)_2$, or a mixture thereof. The alkali may be added to the mixture as a solid material. The alkali neutralizes the humic acid in the humic acid containing raw material, thus bringing them to a water-soluble form as humates. The alkali also dissolves a significant amount of the amorphous silica. The primary reaction product is monosilicic acid, $Si(OH)_4$. The amount of alkali added to the mixture is between 0.5-10% by weight. Normally the amount of alkali added is less than the stoichiometric amount necessary to dissolve all silica and to convert all humic acid. However, the amount of alkali provides sufficient bio-available Si and humates for germination and initial growth period. The surplus amorphous silica will act as a slow release source, thus providing sufficient fertilizing in the later growth periods. The initial pH in the suspension should be at least 9.5, and may be even as high as 13.

The method for the production of the humic substance based fertilizer according to the present invention, comprises mixing 45-95% by weight of a humic acid-containing raw material, 5-50% by weight of an amorphous silica, and 0.5-10% by weight of an alkali, (said amounts are based on the total weight of the dry components) in an aqueous medium forming an aqueous suspension, incubating the suspension at a temperature between 20-70° C. for a period of at least 1 hour and optionally drying the incubated mixture. The dried product should have a residual moisture content between 5-15% by weight.

The humic acid-containing raw material, the amorphous silica and the alkali used in the method for the production of a humic substance based Si-fertilizer, containing storage-stable bio-available Si, should be the same as specified above.

The amount of water should be more than the necessary (stoichiometric) amount for the reactions, the maturation during incubation and the chelate formations. The aqueous suspension should preferably have a water content such that the suspension is stirable and preferably also flowable, to be transportable e.g. by pumping. Thus, the amount of water may be 25-70% by weight, based on the total weight of the suspension. After incubation, the suspension may be used as an aqueous form of the invented Si-fertilizer product. However, for a dried version of the product, the dispersion should not contain too much water, as this will increase the energy demand for removing water in the drying step. Thus, for a dried product the water content is normally not more than about 50% by weight, based on the total weight of suspension. The water content is typically from 25-40% by weight, based on the total weight of the suspension.

Any suitable mixer may be used for preparing the aqueous suspension, e.g. a dispersion mixer. Typically, the humic acid containing raw material and the amorphous silica source are mixed before addition of water and the alkali. This mixing sequence is however not mandatory as any mixing sequence may be used. The thus obtained mixture should be thoroughly mixed into a homogenous suspension, thereby forming an alkaline suspension of dissolved and undissolved constituents. The suspension is left for incubation for a time and a temperature, where the humic acid and the amorphous silica are dissolved, under the formation of humates and monosilicic acid. Without being bound by the theory it is believed that, as monosilicic acid is formed, the monosilicic acid is chelated by a complexing reaction with the water-soluble humates. Monosilicic acid chemically bound as chelates with humates are prevented from polymerization into polysilicic acid. Thus, the silicon is bound as monosilicic acid and remains in a bio-available form.

The incubation temperature is preferable between 20 to 70° C. The incubation time should be from 1 hour to several days. Incubation time at normal temperatures, i.e. ambient temperatures, is typically from 2 to 7 days. An incubation time between 3-5 days at normal temperatures will typically be sufficient for leaching and complexing reactions. During the incubation the pH of the aqueous suspension will decrease from more than 9.5, or even higher, towards a neutral pH of about 6.5-7. Experiments show that similar effects, as for prolonged incubation time at ambient temperatures, may be obtained by a combination of an elevated temperature and agitation. In this case the incubation time may be reduced to a few hours, e.g. incubating at 50-60° C. for about 24 hours. In general, elevating incubation temperatures will reduce the incubation time. Agitation and/or stirring of the suspension during incubation may also promote homogenization and solubilization of monosilicic acid and humic acids, and thus reduce the incubation time. An optimized combination of agitation, temperature and alkaline may reduce incubation time to just about an hour. After incubation the suspension will typically have a pH of about 6.5-7.

To make a dry product the incubated suspension is typically dried by heating to a product temperature between 15 and 95° C., to obtain a product having a residual moisture content of less than 15% by weight. The drying step may be performed in open air, or by use of any conventional drying equipment, possibly including heating means, to reduce the water content. When drying in open air, the drying time is depending on the air humidity and temperature. A residual moisture content in the product of about 10% are in most cases suitable, however it should be noted that the water content may deviate from this specific amount. The product should not be completely dried, as such drying may transform the monosilicic acid bound as chelates to silica, which is a bio-unavailable form of Si. Thus, the residual moisture should not be less than about 5% by weight. The dried product may be crushed and sieved as required, and/or granulated, to produce a product that is easy to handle and use.

The use of the humic substance based Si-fertilizer, according to the present invention, results in a high uptake of Si in cultivated plants. The humic substance based Si-fertilizer, according to the present invention, is used for increasing crops yield, to enhance growth of plants, and prevent diseases in plants. The humic substance based Si-fertilizer, according to the present invention, is also used for protecting plants against biotic and abiotic stresses, and reducing the content of mobile heavy metals in soil and total content of heavy metals in the cultivated plants.

The present invention will be illustrated by the following examples. The examples should not be regarded as limiting for the present invention as these are meant to illustrate different embodiments of the invention and the effect of the usage of the invention.

EXAMPLES

Example 1. Preparation of Dry Humic Substance Based Si-Fertilizer Product

Brown coal (BC) and microsilica (MS) was weighted out in a weight ratio 5:1, in total 60 kg. The BC and MS was dry blended for 4 minutes. About 30 liters of water was added to the mixture of BC and MS, and the blending was continued. 0.6 kg KOH powder was added (1% by weight of dry mix), and the mixture was blended another 4 minutes.

The wet mixture (total weight about 90.6 kg) was retained in the mixer for 3 days at ambient temperature (20-25° C.) and blended 3-4 times every day, 4 minutes each time (incubation process). After 3 days incubation process, the mix was dried in open air for 2 days to about 10% water content. The dried cake was put back into the mixer for de-agglomeration.

Example 2. Test of Plant Growth Under Different Treatments

Table 1 shows the biomass of barley and peas grown under tested product application (without NPK fertilization and without contamination).

The different products tested was brown coal (BC), microsilica, a product prepared according to Example 1, but without incubation, and a Si-fertilizer, according to the present invention, prepared according to the method in Example 1. In the test including precipitated silica (SiO$_2$) (PS), a product was prepared by the same method as the product according to the present invention, as described in Example 1, replacing MS with precipitated silica.

The amount of treatment added to the crop was 300 kg/ha.

TABLE 1

The biomass of barley and peas grown under tested product application

| Treatments | Leaves | Stem | Roots | Leaves | Stem | Roots |
|---|---|---|---|---|---|---|
| | Average for 10 plants, g | | | % | | |
| BARLEY | | | | | | |
| Control | 0.95 | 0.08 | 0.85 | 100.0 | 100.0 | 100.0 |
| Brown coal (BC) | 0.96 | 0.08 | 0.86 | 101.1 | 100.0 | 101.2 |
| Microsilica (MS) | 1.04 | 0.09 | 0.98 | 109.5 | 112.5 | 115.3 |
| BC + MS + KOH (without incubation) | 1.03 | 0.12 | 0.98 | 108.0 | 150.0 | 115.3 |
| BC + MS + KOH (with incubation) | 1.26 | 0.13 | 1.24 | 132.5 | 162.5 | 146.4 |
| Precipitated silica (PS) | 0.97 | 0.08 | 0.84 | 102.1 | 100.0 | 98.8 |
| BC + PS + KOH (with incubation) | 1.01 | 0.09 | 0.88 | 106.3 | 112.5 | 103.5 |
| PEAS | | | | | | |
| Control | 1.52 | 1.18 | 2.36 | 100.0 | 100.0 | 100.0 |
| BC | 1.51 | 1.20 | 2.39 | 99.3 | 101.3 | 101.3 |
| MS | 1.59 | 1.54 | 2.76 | 104.6 | 130.5 | 116.9 |
| BC + MS + KOH (without incubation) | 1.84 | 1.72 | 4.27 | 121.1 | 145.8 | 180.9 |
| BC + MS + KOH (with incubation) | 2.18 | 1.88 | 6.74 | 143.4 | 159.3 | 285.6 |
| PS | 1.53 | 1.19 | 2.38 | 100.7 | 100.8 | 100.8 |
| BC + PS + KOH (with incubation) | 1.84 | 1.23 | 2.84 | 121.1 | 104.2 | 120.3 |
| LSD$_{05}$ | 0.04 | 0.05 | 0.05 | | | |

The test results presented in Table 1, show a significant higher yield with the application of the Si-fertilizer according to the present invention.

Example 3. Uptake of Si in Plants Fertilized with the Inventive Si-Fertilizer Table 2 shows the uptake of Si, both monosilicic acid and polysilicic acid, in roots and leaves, in plants fertilized with the Si-fertilizer prepared in Example 1, or microsilica. The amount of treatment added to the crop was equivalent to 300 kg/ha.

TABLE 2

Uptake of Si, both monosilicic acid and polysilicic acid, in crops.

| | Amount of monosilicic acid in roots and leaves of barley mg Si/kg dry weight BARLEY | | | | Amount of polysilicic acid in roots and leaves of barley mg Si/kg dry weight BARLEY | | | |
|---|---|---|---|---|---|---|---|---|
| | Apoplast | | Symplast | | Apoplast | | Symplast | |
| | Roots | Leaves | Roots | Leaves | Roots | Leaves | Roots | Leaves |
| Control | 21.4 | 35.2 | 275 | 285 | 240 | 396 | 322 | 453 |
| MS | 43.4 | 69.5 | 497 | 520 | 433 | 538 | 520 | 558 |
| BC + MS + KOH (with incubation) | 54.5 | 79.7 | 598 | 628 | 489 | 622 | 720 | 845 |

| | Amount of monosilicic acid in roots and leaves of peas mg Si/kg dry weight PEAS | | | | Amount of polysilicic acid in roots and leaves of peas mg Si/kg dry weight PEAS | | | |
|---|---|---|---|---|---|---|---|---|
| | Apoplast | | Symplast | | Apoplast | | Symplast | |
| | Roots | Leaves | Roots | Leaves | Roots | Leaves | Roots | Leaves |
| Control | 20.1 | 29.3 | 150.8 | 182.3 | 82.4 | 145.6 | 415.8 | 283.5 |
| MS | 28.3 | 33.4 | 190.2 | 193.2 | 92.4 | 234.5 | 458.9 | 314.5 |
| BC + MS + KOH (with incubation) | 38.4 | 39.2 | 239.4 | 205.3 | 99.4 | 284.4 | 502.3 | 335.4 |

In the above tests the amount of treatment product added to the crop was equivalent to 300 kg/ha. This means that the product according to the present invention containing brown coal (BC), microsilica (MS) and KOH, only a total of 60 kg/ha of MS is added. This is 5 times lower amount compared to when MS is added on its own. In spite of this lower amount of MS added to the crop, there is still a significant increase in crop yield and uptake of Si in the plants.

Example 4. Si in Rice Plants Treated with the Inventive Si-Fertilizer Vs. Different Products Si in rice plants treated with different products has been extracted using different methods. Table 3 shows treatment with the Si-fertilizer, according to present invention, results in the highest uptake of Si in the rice plants, and this result is independent of the method used to extract the Si.

TABLE 3

Si in rice, extracted by using various methods.

| Treatment | Water, monosilicic acid | 0.1 n HCl | 0.1M $CaCl_2$ | 0.5M Acetic acid |
|---|---|---|---|---|
| | | Si mg/kg | | |
| Control | 5.22 | 172.5 | 8.63 | 14.3 |
| Microsilica | 5.68 | 190.2 | 11.4 | 16.73 |
| BC + MS + KOH (incubated) | 7.38 | 211.7 | 14.06 | 18.89 |
| Brown coal | 5.03 | 174.9 | 9.32 | 15.96 |
| Ground Slag | 5.86 | 172.6 | 12.06 | 14.83 |

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. A humic substance based Si-fertilizer product comprising storage-stable bio-available Si, produced by forming an aqueous suspension of a mixture of
   45-95% by weight of a humic acid-containing raw material,
   5-50% by weight of amorphous silica, and
   0.5-10% by weight of an alkali,
wherein the amounts are based on the total weight of the dry components, the aqueous suspension is incubated for a time and a temperature where humic acid and amorphous silica dissolve forming humates and monosilicic acid, thereby forming an incubated suspension, in which the bio-available silicon is in the form of water-soluble chelates of monosilicic acid-humate compounds, formed by complexing reactions between the monosilicic acid and the humates.

2. The Si-fertilizer product according to claim 1, wherein the incubated suspension is dried until a residual moisture of less than 15% by weight.

3. The Si-fertilizer product according to claim 1, wherein the product includes a matrix comprising undissolved residues of the humic acid-containing raw material and undissolved residues of the amorphous silica.

4. The Si-fertilizer product according to claim 1, wherein the humic acid-containing raw material is selected from the group consisting of coal, brown coal, peat, humic soil, and a mixture of thereof.

5. The Si-fertilizer product according to claim 4, wherein the humic acid-containing raw material is brown coal.

6. The Si-fertilizer product according to claim 1, wherein the amorphous silica is selected from the group consisting of microsilica, diatomaceous earth, rice husk ash, zeolites, and a mixture thereof.

7. The Si-fertilizer product according to claim 6, wherein the amorphous silica is microsilica.

8. The Si-fertilizer product according to claim 1, wherein the alkali is selected from the group consisting of an alkali metal hydroxide, an alkaline earth metal hydroxide and a mixture thereof.

9. The Si-fertilizer product according to claim 1, wherein the dried product is de-agglomerated and/or granulated.

10. A method for the production of a humic substance based Si-fertilizer containing storage-stable, bio-available Si, comprising the following steps (amounts based on the total weight of the dry components),
    mixing 45-95% by weight of a humic acid-containing raw material,
    5-50% by weight of an amorphous silica, and
    0.5-10% by weight of an alkali,
    in an aqueous medium forming an aqueous suspension,
    incubating the suspension for a time and a temperature, and optionally drying the incubated suspension,
    wherein the amounts are based on the total weight of the dry components.

11. The method according to claim 10, wherein the incubated suspension is dried until a residual moisture content of less than 15% by weight.

12. The method according to claim 10, wherein the aqueous suspension is incubated at a temperature between 20-70° C. for a period of at least 1 hour.

13. The method according to claim 10, wherein the incubated mixture is dried by heating to a product temperature between 15 and 95° C.

14. The method according to claim 10, wherein the humic acid-containing raw material is selected from the group consisting of coal, brown coal, peat, humic soil, and a mixture of thereof.

15. The method according to claim 14, wherein the humic acid-containing raw material is brown coal.

16. The method according to claim 10, wherein the humic acid-containing raw material is added in an amount of 60-90% by weight, or 75-85% by weight, based on the total weight of dry components.

17. The method according to claim 10, wherein the amorphous silica is selected from the group consisting of microsilica, diatomaceous earth, rice husk ash, zeolites, and a mixture thereof.

18. The method according to claim 17, wherein the amorphous silica is microsilica.

19. The method according to claim 10, wherein the amorphous silica is added in an amount of 10-30% by weight, or 15-25% by weight, based on the total amount of dry components.

20. The method according to claim 10, wherein the alkali is selected from the group consisting of an alkali metal hydroxide, an alkaline earth metal hydroxide and a mixture thereof.

21. The method according to claim 10, wherein the amount of water is 25-70% by weight, based on the total weight of the suspension.

22. The method according to claim 10, wherein the initial pH in the aqueous suspension, before incubation, is 9.5 or higher.

23. The method according to claim 11, wherein the dried product is de-agglomerated, and/or granulated.

24. A method for increasing the uptake of silicon in cultivated plants, comprising adding the humic substance based Si-fertilizer according to claim 1 to the soil before seeding or planting and/or during the growth of the plants.

25. The method according to claim 24, where the humic substance based Si-fertilizer is added in an amount of 50-1000 kg/ha.

* * * * *